Dec. 29, 1931.  O. G. HITCHCOCK  1,838,180
PIPE COUPLING
Filed May 1, 1929
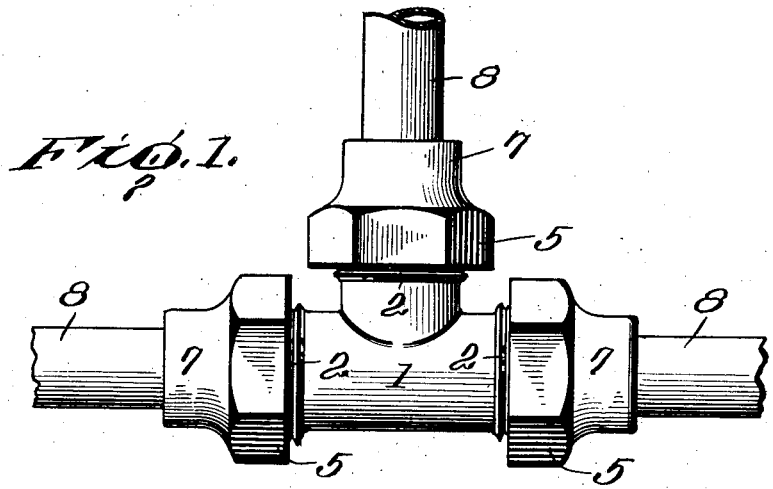
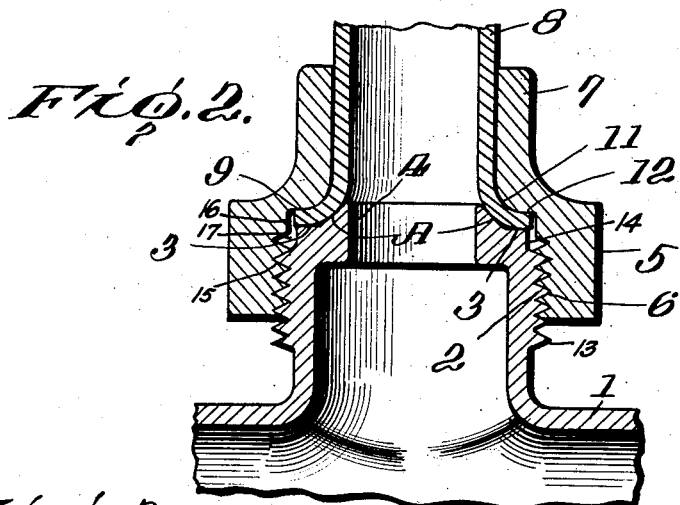
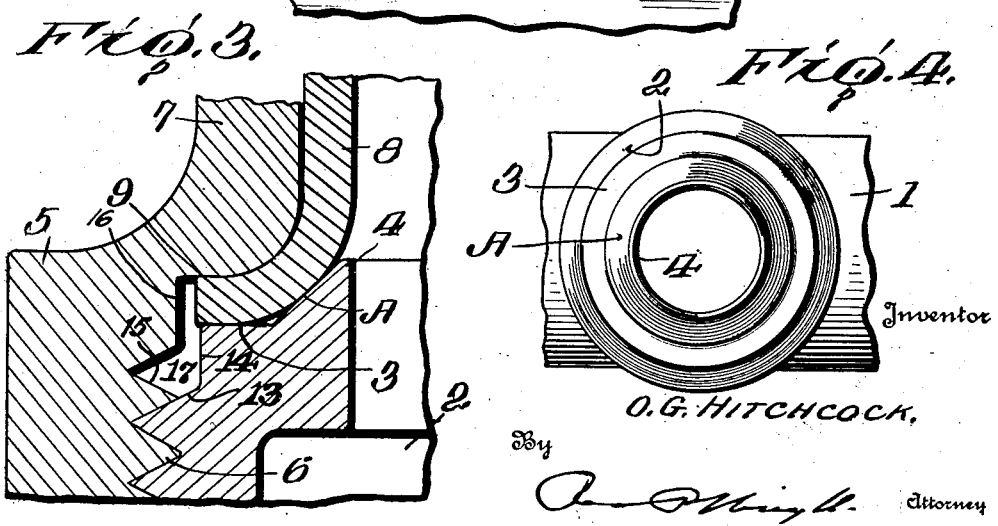
Inventor
O. G. HITCHCOCK.
By
Attorney Patented Dec. 29, 1931

1,838,180

UNITED STATES PATENT OFFICE

OTTO G. HITCHCOCK, OF ERIE, PENNSYLVANIA, ASSIGNOR TO HAYS MANUFACTURING CO., OF ERIE, PENNSYLVANIA, A CORPORATION OF PENNSYLVANIA

PIPE COUPLING

Application filed May 1, 1929. Serial No. 359,695.

This invention relates to certain new and useful improvements in pipe couplings and is in the nature of an improvement on the construction of coupling disclosed in my application filed February 28, 1928, Serial Number 257,734, the object being to provide a novel form of coupling for connecting a copper tubing or the like to a plumbing fitting whereby a double seal is obtained and a construction is provided which is exceedingly simple and cheap to manufacture.

Another object of my invention is to provide a pipe coupling in which a threaded nipple terminates into a horizontal seat having an annular projecting lip, which not only forms contact with the flange of the copper tubing, but serves the purpose of guiding the tubing in position on the seat so that when the nut is screwed down, a two-point seal is formed.

A still further object of the invention is to provide a pipe coupling which is especially adapted to be used in connecting the copper tubing to a plumbing fitting in which the copper tubing has a 90° flange formed on its end cooperating with the horizontal and inclined seat of the fitting so that a two-point seal is produced in order to form a tight joint without weakening the connection in any way.

Other and further objects and advantages of the invention will be hereinafter set forth and the novel features thereof defined by the appended claim.

In the drawings,

Figure 1 is a side elevation of a T fitting showing the application of my improved construction of pipe coupling;

Figure 2 is a detail enlarged vertical section through the coupling;

Figure 3 is a detail enlarged section showing the points of contact in order to form a double seal; and Figure 4 is a top plan view of one of the nipples of the fitting.

In the embodiment of my invention as herein illustrated, I show a T fitting in which each of the arms of the T terminate in a nipple having a threaded portion and the construction of coupling of each nipple is identical therefore it is only necessary to describe the particular construction of one nipple to allow my invention to be fully understood by anyone skilled in the art and while I have shown my coupling used in connection with a fitting, it is, of course, understood that I do not wish to limit myself to any particular use of the coupling as I am aware that it can be used for connecting a copper tubing to any construction of plumbing fitting without departing from the spirit of my invention.

In the drawings 1 indicates the T fitting herein shown having connected thereto three copper tubings by my improved construction of coupling. Each of the arms of the fitting terminates in a threaded nipple 2 having a horizontally disposed shoulder 3 at its end which merges into an annular projection 4 cut at 45° to form an oblique seat A in connection with the horizontal seat 3 for the end of the copper tubing as will be hereinafter fully described. The threads 13 of the nipple 3 do not extend to the outer marginal end of the nipple whereby a smooth and reduced peripheral portion 14 of the nipple is provided.

A nut 5 having an internally threaded portion 6 is adapted to work on the threaded nipple 2, said nut terminating in a neck portion 7 provided with a smooth bore through which is adapted to extend the copper tubing 8 to be connected, said copper tubing having a 90° flange 9 formed on its end as clearly shown. The nut is provided internally with an annular convexed portion 11 which merges at one end into the smooth bore of the neck 7 and at its upper end into a horizontally disposed shoulder 12 so that when the flanged end of the tubing is in engagement with the horizontal and oblique seats formed on the end of the nipple and the nut is screwed down, the flange of the tubing at the turn of the flange, is forced downwardly against the projecting lip or annular seat and by continuing drawing down on the nut, the tubing is forced to make an additional seat on the horizontally disposed seat of the nipple, whereby a double seal is formed between the fitting and the tubing and at the same time the annular seat forms a pilot for centering the tubing when the nut is being screwed down onto the nipple in order to force the flange into contact with the seats.

The internal threads 15 of the nut 5 do not extend to the shoulder 12 so that a smooth surface 16 is presented in spaced opposed relation to the surface 14 when the parts are assembled. A recess 17 is thus provided in the assembled coupling, and the possibility of the metal of the pipe squeezed into the recess or in abutting engagement with the surface 16 being forced into engagement with the threads is remote indeed.

In the construction as herein shown, in connecting the copper tubing to a fitting, the nut is slipped over the tubing which has previously been flanged or is flanged after the nut has been placed thereon and by placing the nut in position on the threaded nipple and screwing down on the nut, the raised or annular projecting lip first engages the copper tube so as to enter the flange on the end of a nipple which is provided with seats and as the nut is drawn up, the flanged end of the copper tubing by the particular construction of seats and the particular construction of nut is forced into engagement with the spaced seats to form a double seal which forms a strong connection between the copper tubing and the fitting without any danger of injuring the copper tubing or weakening the connection between the tubing and fitting.

From the foregoing description it will be seen that I have provided a pipe coupling in which a threaded nipple is employed having a horizontally disposed seat merging into an obliquely arranged seat against which is adapted to be forced the flanged end of a copper tube by a specially constructed nut which has an annular convexed surface merging into a horizontal shoulder which causes the flange of the tube to be brought first into contact with the oblique seat and then into contact with the horizontal seat to form a double seal.

What I claim is:

A pipe coupling for use with copper tubing having a preformed smoothly flared end portion terminating at a right angle in a flat faced flange, said coupling consisting of a nipple having an externally threaded end with the threads thereof terminating short of the extremity to provide a reduced smooth annular portion having a 90° end face formed with a central annular conical portion extending therefrom to provide a substantially 45° smooth face, and a nut having a neck for receiving the tubing and an enlarged portion internally threaded for cooperation with the threads of said nipple, said nut having an inwardly convex smooth shoulder joining said neck and enlarged portion for close surface contact with the smoothly flared end portion of said tubing, the nut when threaded home on said nipple forcing said flared end portion of said tubing into contact with said nipple end with said smoothly flared portion of the tubing contacting the 45° smooth face of said nipple and the flat faced flange of said tubing contacting said 90° end face of said nipple to provide a double seal with an intervening annular space.

In testimony whereof I hereunto affix my signature.

OTTO G. HITCHCOCK.